United States Patent
Vandemark et al.

(10) Patent No.: US 11,542,091 B2
(45) Date of Patent: Jan. 3, 2023

(54) SHIPPING PACKAGE FOR LITHIUM BATTERY

(71) Applicant: CellBlock FCS, LLC, Standish, ME (US)

(72) Inventors: Dylan Francis Vandemark, Hiram, ME (US); Matthew Lloyd Vandemark, Hiram, ME (US)

(73) Assignee: CELLBLOCK FCS, LLC, Standish, ME (US)

(*) Notice: Subject to any disclaimer, the term of this patent is extended or adjusted under 35 U.S.C. 154(b) by 0 days.

(21) Appl. No.: 17/380,481

(22) Filed: Jul. 20, 2021

(65) Prior Publication Data
US 2022/0024674 A1    Jan. 27, 2022

Related U.S. Application Data

(60) Provisional application No. 63/055,376, filed on Jul. 23, 2020.

(51) Int. Cl.
| B65D 81/38 | (2006.01) |
| B65D 51/16 | (2006.01) |
| B65D 5/56 | (2006.01) |
| B65D 85/00 | (2006.01) |

(52) U.S. Cl.
CPC ........... B65D 81/3813 (2013.01); B65D 5/56 (2013.01); B65D 51/1616 (2013.01); B65D 85/70 (2013.01)

(58) Field of Classification Search
CPC ...... B65D 81/3813; B65D 81/09; B65D 5/56; B65D 51/1616; B65D 85/70; B65D 77/0426; B65D 2585/88

USPC ........ 206/701–705; 220/560.01, 88.1, 367.1, 220/62.15, 23.87, 371; 428/920–921, 428/35.9, 216, 34.4; 109/82–84, 49.5, 23
See application file for complete search history.

(56) References Cited

U.S. PATENT DOCUMENTS

| 3,268,107 | A | * | 8/1966 | Sperling | F42D 5/04 |
| | | | | | 220/772 |
| 3,669,299 | A | * | 6/1972 | Jones | B65D 81/022 |
| | | | | | 220/592.2 |
| 3,764,035 | A | * | 10/1973 | Silverman | B65D 81/18 |
| | | | | | 220/900 |
| 4,100,860 | A | * | 7/1978 | Gablin | B65D 88/121 |
| | | | | | 220/900 |
| 4,405,076 | A | * | 9/1983 | Lines, Jr | B32B 15/04 |
| | | | | | 220/88.1 |

(Continued)

FOREIGN PATENT DOCUMENTS

WO    WO-2005085746 A1 *  9/2005  ............. F42B 39/14

*Primary Examiner* — Chun Hoi Cheung
*Assistant Examiner* — Brijesh V. Patel
(74) *Attorney, Agent, or Firm* — Shlesinger, Arkwright & Garvey, LLP

(57) ABSTRACT

The invention is a shipping container for high watt-hour lithium-ion batteries, the container comprising an interior metal container and an exterior container within which the interior metal container is disposed, the interior metal container containing a free flowing expanded glass granulate having fire extinguishing properties, the interior metal container including a vent member for releasing gas from the interior container in a controlled manner, the vent having a cooperating heat shield in contact therewith to prevent ignition of gas exiting the vent and also suppress the heat associated with the exiting gas.

13 Claims, 3 Drawing Sheets

(56) References Cited

U.S. PATENT DOCUMENTS

| | | | | |
|---|---|---|---|---|
| 4,685,402 | A * | 8/1987 | Nelson | E05G 1/024 |
| | | | | 312/409 |
| 4,741,937 | A * | 5/1988 | Parker | B65F 1/14 |
| | | | | 428/920 |
| 5,004,632 | A * | 4/1991 | McGarvey | B65D 90/501 |
| | | | | 220/560.04 |
| 5,069,358 | A * | 12/1991 | Avery, Jr. | G11B 33/04 |
| | | | | 29/469 |
| 5,337,917 | A * | 8/1994 | Pierce | G21F 5/08 |
| | | | | 220/560.01 |
| 5,421,479 | A * | 6/1995 | Noorafshani | F42B 39/14 |
| | | | | 220/571 |
| 5,727,707 | A * | 3/1998 | Wickland | B65D 85/82 |
| | | | | 220/641 |
| 5,984,126 | A * | 11/1999 | Gordon | A62C 2/065 |
| | | | | 220/88.1 |
| 6,061,985 | A * | 5/2000 | Kraus | E04B 9/001 |
| | | | | 52/794.1 |
| 6,116,348 | A * | 9/2000 | Drakin | A62C 5/006 |
| | | | | 169/46 |
| 6,187,474 | B1 * | 2/2001 | Chalasani | H01M 50/256 |
| | | | | 429/163 |
| 6,619,499 | B1 * | 9/2003 | Lin | B65D 51/1616 |
| | | | | 220/256.1 |
| 6,686,003 | B2 * | 2/2004 | Legare | E05G 1/024 |
| | | | | 428/920 |
| 6,726,047 | B2 * | 4/2004 | Lin | B65D 51/1683 |
| | | | | 220/203.11 |
| 8,562,721 | B2 | 10/2013 | Lakamraju et al. | |
| 9,415,248 | B2 * | 8/2016 | Donahue | A62C 99/0009 |
| 9,709,370 | B1 * | 7/2017 | Keller | B65B 7/16 |
| 9,890,988 | B2 * | 2/2018 | Howland | F25D 23/068 |
| 10,173,087 | B2 | 1/2019 | Basham et al. | |
| 10,490,785 | B1 * | 11/2019 | Simontacchi | H01M 50/24 |
| 2005/0242093 | A1 * | 11/2005 | Sharpe | F42B 39/14 |
| | | | | 220/62.11 |
| 2006/0087061 | A1 * | 4/2006 | Wei | E04C 1/42 |
| | | | | 264/621 |
| 2007/0000925 | A1 * | 1/2007 | Fortin | G11B 23/021 |
| | | | | 220/88.1 |
| 2007/0131684 | A1 * | 6/2007 | Cirillo | F42B 39/14 |
| | | | | 220/88.1 |
| 2010/0084403 | A1 * | 4/2010 | Popish | B65D 25/2858 |
| | | | | 220/318 |
| 2012/0305567 | A1 * | 12/2012 | Abbe | B65F 1/1623 |
| | | | | 220/810 |
| 2013/0146603 | A1 * | 6/2013 | Brilmyer | H01M 50/24 |
| | | | | 220/560.01 |
| 2014/0170447 | A1 * | 6/2014 | Woehrle | H01M 50/682 |
| | | | | 429/61 |
| 2016/0091141 | A1 * | 3/2016 | Gehlhausen | B65D 81/38 |
| | | | | 220/560.01 |
| 2017/0045335 | A1 * | 2/2017 | Abbe | B65F 1/08 |
| 2017/0110757 | A1 * | 4/2017 | Pasewald | B65B 29/00 |
| 2017/0155103 | A1 | 6/2017 | Pasewald | |
| 2017/0237054 | A1 | 8/2017 | Mast | |
| 2018/0087272 | A1 * | 3/2018 | Vandemark | B65D 90/022 |
| 2020/0101334 | A1 | 4/2020 | Vandemark et al. | |

* cited by examiner

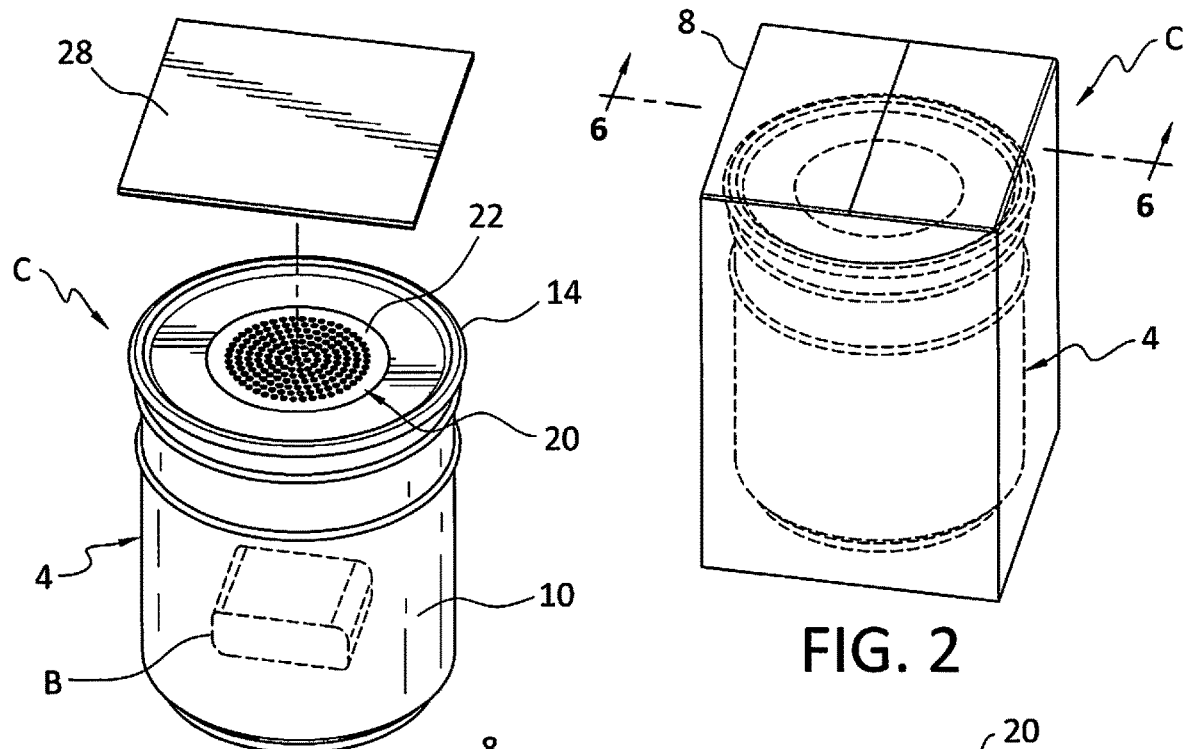
FIG. 2
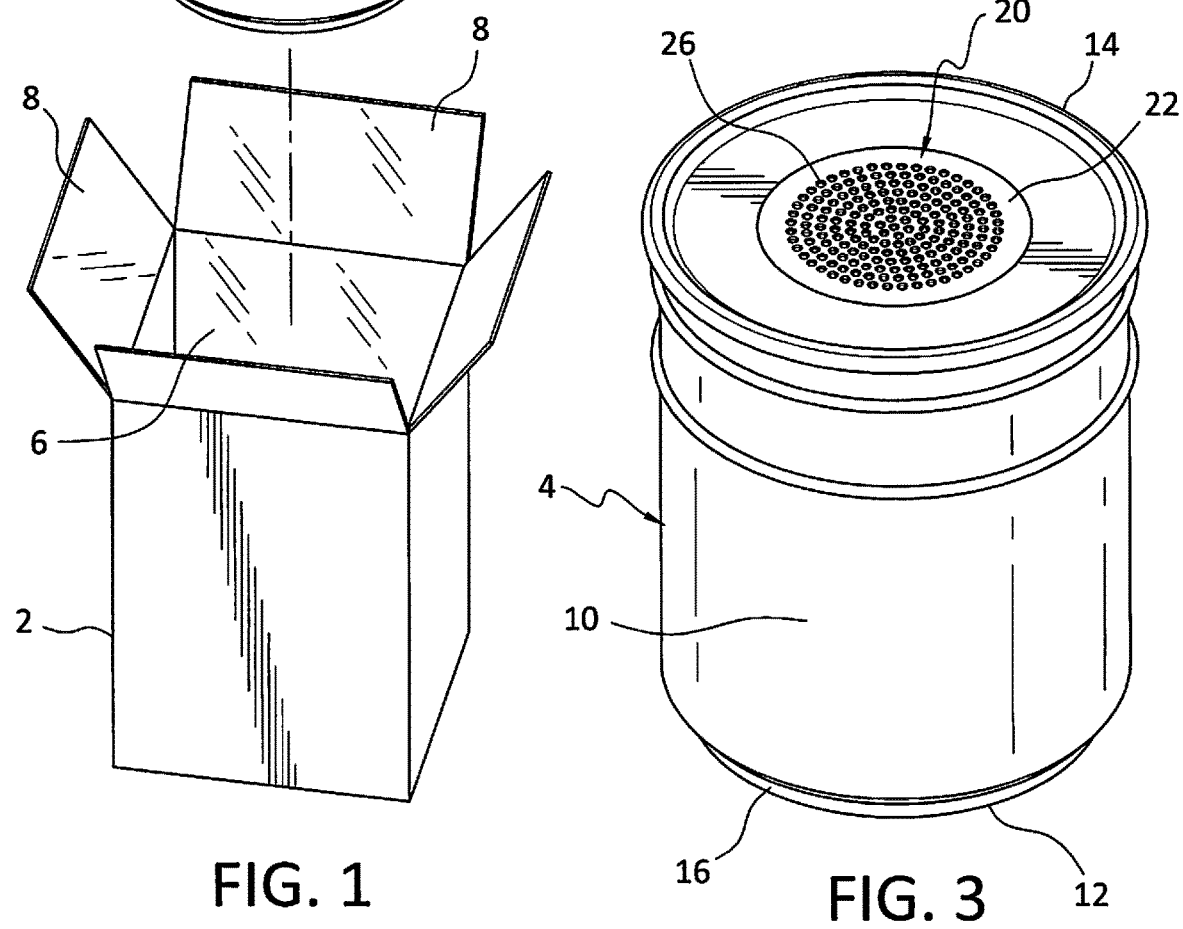
FIG. 1
FIG. 3

SHIPPING PACKAGE FOR LITHIUM BATTERY

CROSS-REFERENCE TO RELATED APPLICATIONS

This application claims the benefit of priority from U.S. Provisional Application Ser. No. 63/055,376 filed on Jul. 23, 2020, which is incorporated herein by reference.

FIELD OF THE INVENTION

The present invention relates to a shipping container for high watt-hour lithium-ion batteries.

BACKGROUND OF THE INVENTION

Lithium electronic batteries are found in a wide variety of consumer goods, such as cellphones, laptops, power tools and electric vehicles. Depending upon the device's power consumption, a higher watt-hour battery may be preferred. Watt-hours represent the capacity of a given battery. A so-called high watt-hour battery is useful because it provides a longer run time and generates more work than a comparably sized lower watt-hour battery. A lithium battery having a longer run time between recharging, which a high-watt hour battery provides, is desirable for obvious reasons.

When improperly handled, manufactured, or otherwise damaged, lithium-ion batteries are subject to thermal runaway i.e. the battery spontaneously increases in temperature and begins venting hot and toxic pressurized gases. This in turn causes the lithium-ion fluid within the battery to ignite, reaching temperatures in excess of 2,000 degrees Fahrenheit. A high watt-hour battery under thermal runaway is especially dangerous due to its extreme volatility and the large quantity of energy and gas that is released.

The inherent danger of high watt-hour lithium batteries has an enormous impact on the shipping requirements for such batteries. If high watt-hour batteries are a core component of a company's business model, the company will retain the sole responsibility for disposal or recycle of the batteries including retrieving defective batteries from consumers. Currently, packaging for shipping high watt-hour batteries must be DOT compliant and shipping personnel require specialized training. In addition to DOT requirements, commercial parcel carriers require separate safety measures for the packaging before it is accepted for shipment.

Prior art containers for shipping damaged, defective, or recalled high watt-hour lithium batteries comprise expensive cases manufactured from aluminum or steel. The cases are UN certified and shipped in accordance with current DOT requirements including the necessary personnel training, associated paperwork, and carrier approval. The total costs associated with the prior art shipping methods are prohibitive. Further, the prior art shipping containers are subject to failure notwithstanding the construction materials. In particular, if the package is reinforced to contain the fire and high heat generated by thermal runaway, failure will result from over-pressurization of the container. This is primarily due to a failure to adequately relieve pressure from inside the package during a thermal runaway event. The hydrogen and ether generated during the event exits the package in an uncontrolled manner and ignites once it comes into contact with ambient oxygen. Conversely, if the container is adapted to release and mitigate pressure during a thermal runaway event, failure will nevertheless occur because the container structure cannot withstand the extreme heat and fire inside or the hot and flammable gases that are released ignite outside of the container.

A need has therefore existed in the art for a high watt-hour lithium battery shipping container that will vent gases generated during a battery fire in a controlled manner yet contain the fire within the packaging, is economical to manufacture, obviates the need for specialized training of the shipper and special permitting typically associated with prior art lithium battery shipment containers.

BRIEF SUMMARY OF THE INVENTION

The present invention is a shipping container for high watt-hour lithium-ion batteries, the container comprising an interior metal container and an exterior container housing the interior metal container, the interior metal container containing a free flowing expanded glass granulate having fire extinguishing properties, the interior metal container further including a vent for releasing gas from the container in a controlled manner, the vent having a cooperating heat shield in contact therewith to prevent ignition of the gas exiting the vent and to suppress the heat associated with the exiting gas.

The present invention is also directed to a shipping container for lithium batteries comprising an exterior container having a top, bottom and sides, a metal container having a removable top, a bottom and sides, the metal container is disposed within the exterior container, free-flowing expanded glass granulate having fire extinguishing properties, the expanded glass granulate is disposed inside of the metal container, a gas vent, the gas vent is within the top of the metal container, the gas vent comprising a particulate screen member and an aperture cap member, and a fire and heat shield member, the fire and heat shield member is sandwiched between the metal container top and the exterior container top so that in the event a lithium battery within the container catches fire during shipment the free flowing expanded glass granulate will suppress the fire and the container will be depressurized so that vented gas cannot collect between the exterior container top and the metal container top.

BRIEF DESCRIPTION OF THE SEVERAL VIEWS OF THE DRAWINGS

FIG. 1 is an exploded perspective view showing the shipping container according to the present invention;

FIG. 2 is a perspective view of the shipping container in FIG. 1 when assembled;

FIG. 3 is a perspective view of the interior metal container of present invention;

DETAILED DESCRIPTION OF THE INVENTION

FIG. 1 illustrate the shipping container C according to the present invention which is shown to comprise an exterior container 2 and an interior container 4. The interior container 4 may be manufactured from any metal or other material having a sufficiently high melting point. In a preferred embodiment the interior metal container 2 is manufactured from steel. The exterior container 2 is shown to comprise a box adapted to receive the interior container 4. The exterior container is manufactured from any of a variety of conventional shipping container materials including corrugated cardboard. The exterior container is lined with a metal foil 6 and has flaps 8 at one end for sealing the exterior container 2 as best shown in FIG. 2.

Figures 4, 5:
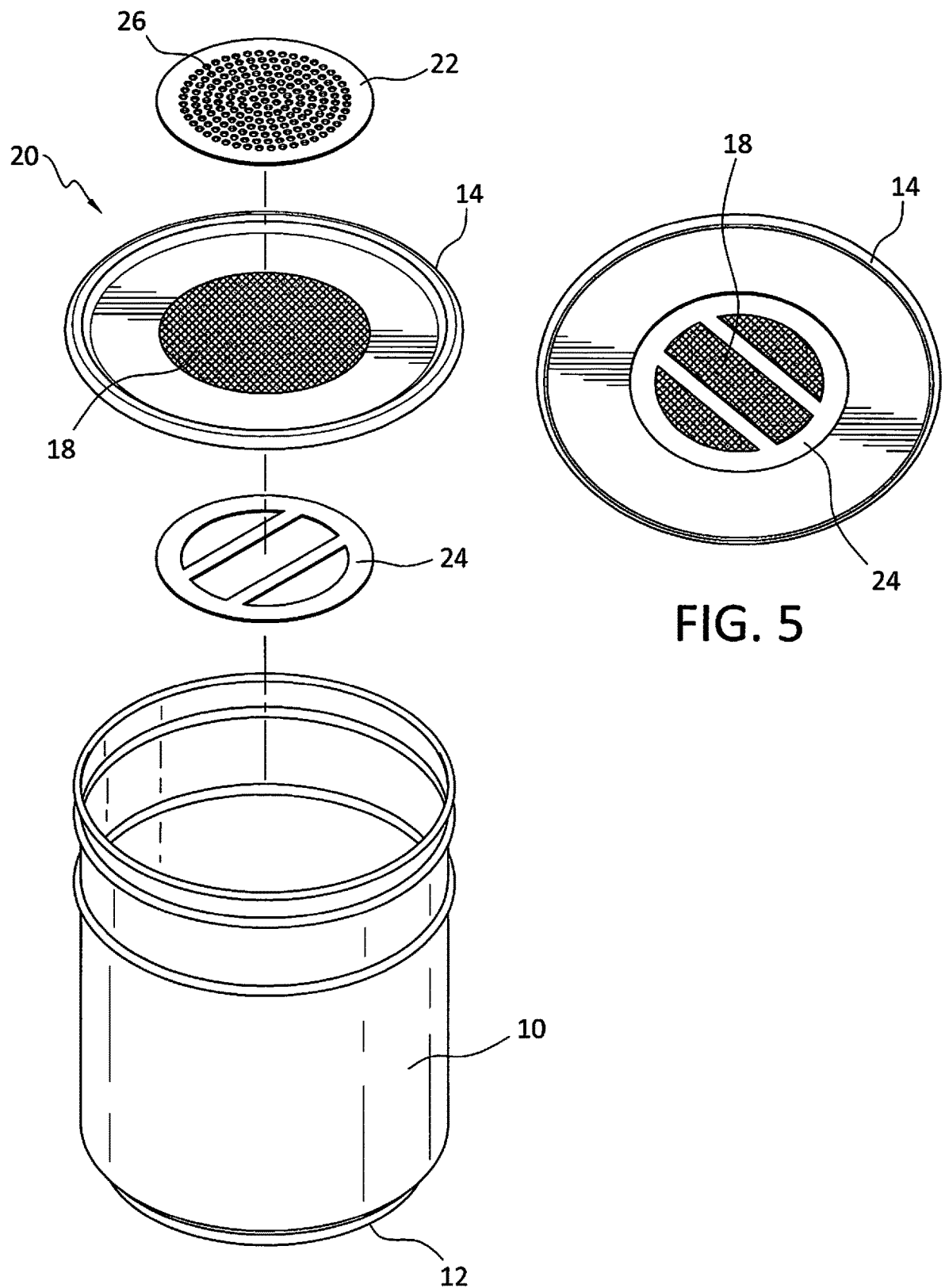
FIG. 4 is an exploded perspective view of the interior metal container shown in FIG. 3.
FIG. 5 is a bottom plan view of the interior metal container top.
Figure 6:
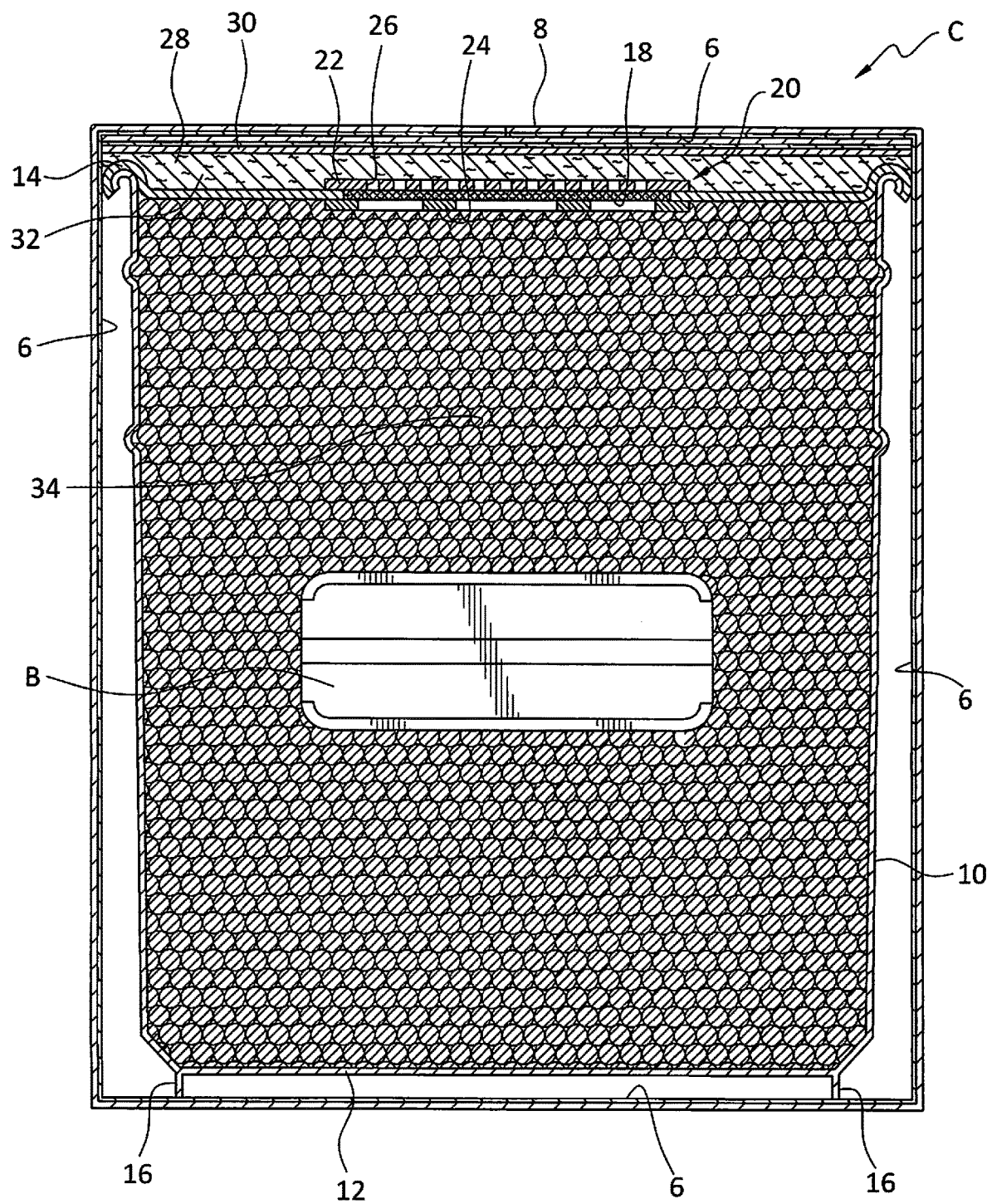
FIG. 6 is a cross-sectional view taken along lines 6-6 of FIG. 2.

Turning to FIGS. 3, 4 and 5, the interior container 4 is shown in greater detail and can be seen to comprise side wall 10, bottom 12 and removable top or lid 14 having a lip member. As best shown in FIG. 6, the bottom 12 of interior container 4 includes a flange 16 or foot member to support the interior container in an upright position. The interior container is spaced from the bottom of the exterior container. The side walls of the interior container are also spaced from the side walls of the exterior container as shown.

FIG. 4 illustrates lid 14 of the interior container 4 in greater detail and in particular, vent 20 which is shown to comprise a fine mesh screen 18 sandwiched between a vent cap 22 having passageways 26 and an underlying support member 24. In a preferred embodiment the screen 18 is manufactured from steel. The mesh screen 18 permits gas to pass through but prevents debris or other fine particles from passing. The larger passageways 26 of vent cap 22 allows the filtered gas to continue to pass upwardly and in a controlled manner to simultaneously prevent over-pressurization of the container and excessive release of the flammable gases. The underlying support member 24 provides rigid support to the underside of mesh screen 18 which can be subject to stress during a thermal runaway event inside the container C.

As best shown in FIGS. 1 and 6, a fire and heat shield 28 is placed over the top 14 of interior container 4. The shield is preferably sized so that it is closely fitted within exterior container 2 and generally abuts the side walls as shown in the figure. The shield 28 comprises a rigid top 30, such as cardboard, having a layer 32 of highly fireproof material secured to the underside of top 30. Felt fireproof material according to the present invention may be a high temperature resistant, carbon-based fiber. A preferred textile comprises a layer of polyacrylonitrile (PAN) scrim (or a silica fiber mesh), either alone, or sandwiched between two outer layers of BELCOTEX fibers provided with an oxidized polyacrylonitrile (OPAN) fiber cap (or otherwise coated on one or both sided with a high temperature resistant carbon based fiber). These materials including equivalents are commercially available from Textech Industries. As is apparent, other high temperature resistant textiles are within the scope of the present invention for layer 32 so long as they meet the temperature resistant requirements set forth above.

The heat shield functions to block the intense heat generated and released with depressurization of the container by the vent during a thermal runaway event. Equally important, the heat shield prevents flammable gas generated by the thermal event from igniting at the vent because it functions to starve oxygen at the vent and prevents the ability of the escaping gas to collect at the top of the interior of the container C. With the shield in place as described above, flammable gas generated during a thermal runaway event is able to be released from the container in a controlled fashion and without ignition and once released, the hydrogen and ether gases are too low in concentration to permit ignition.

As best shown in FIG. 6, the inside of the interior container 4 is filled with free-flowing expanded glass granulate 34. The granules are relatively small, lightweight spheres of expanded (i.e. foamed) silicon dioxide glass having interior pores that provide a closed cell structure and about 70-80% air by volume. The granules readily absorb heat and smoke and function as an insulator during a fire event and assist in extinguishing a fire within the container C by displacing oxygen. The size of the aggregate correlates to its interior pore size and hence its relatively low density that enhances its utility as a reactive extinguisher. In the alternative, a hydrous, phyllosilicate mineral, such as Vermiculite clay, may be used in place of the expanded glass.

The size of the expanded glass granulate in the present invention is preferably non-uniform and comprises a blend of varying sized granules. The smallest size granules have relatively greater density and a smaller pore size while the largest sized granules have the lower density and a larger pore size. In a preferred embodiment, the size of the loose fill granulate is between about 1 mm diameter to about 4 mm in diameter. A suitable composition for the granulate is a blend of 1 mm, 2 mm, 3 mm and 4 mm diameter size spheres combined in a 1:1:1:1 ratio. The preferred blend has a total air content of about 70-80% by volume and an average density of about 10 bs/ft^3 to promote sufficient absorption of heat, provide enhanced insulative properties from the heat of the fire and also provide low heat transference. The intense heat generated by a lithium battery fire will cause at least some of the granules to melt. During a thermal runaway event, the expanded glass granulate that surrounds the battery B (FIGS. 1 and 6), in the optimized size gradations set forth above, imparts heat protection to the interior and exterior containers due to its insulative nature, reduces the amount of available oxygen inside the container, absorbs flammable electrolyte generated during the thermal event, and melts around the battery to further isolate flammable components within the container.

In sum, the present invention has addressed the dual problem of containing the extreme heat and fire generated within the container while at the same time safely preventing over-pressurization of the container and ignition of the gases that are vented.

While this invention has been described as having a preferred design, it is understood that it is capable of further modifications, uses and adaptations, both in whole and in part, while following the general principle of the invention including such departures from the present disclosure as is known or customary practice in the art to which this invention pertains, and as may be applied to the central features of this invention.

We claim:

1. A shipping container for lithium batteries comprising:
   a) an exterior container having a top, bottom and sides;
   b) a metal container having a top, bottom and sides, the metal container is disposed within the exterior container;
   c) a free-flowing expanded glass granulate having fire extinguishing properties, the expanded glass granulate is provided inside of the metal container;
   d) a gas vent, the gas vent is disposed within the metal container top, the gas vent comprising a particulate screen and cap member having apertures; and
   e) a fire and heat shield member, the fire and heat shield member is sandwiched between the metal container top and the exterior container top whereby when a lithium battery placed in the metal container catches fire, the fire will be suppressed by the free flowing expanded glass granulate and the shipping container will be depressurized so that vented gas cannot collect between the exterior container top and the metal container top.

2. The shipping container as in claim 1 and wherein the free-flowing expanded glass granulate comprises foamed silicon dioxide glass spheres.

3. The shipping container as in claim 2 and wherein the foamed silicon dioxide glass spheres have a diameter between about 1 mm to about 4 mm.

4. The shipping container as in claim 3 and wherein the foamed silicon dioxide glass spheres are provided as a blend of spheres having a diameter of 1 mm, 2 mm, 3 mm and 4 mm and in a ratio of 1:1:1:1.

5. The shipping container as in claim 1 and further comprising a reinforcing member, the reinforcing member is in contact with the particulate screen member to provide rigid support for the same.

6. The shipping container as in claim 1 and wherein the fire and heat shield member abuts the sides of the exterior container.

7. The shipping container as in claim 1 and wherein the fire and heat shield member comprising a rigid sheet laminated with one or more compressible fire-proof materials.

8. The shipping container as in claim 7 and wherein the compressible fire-proof materials are selected from the group consisting of a high temperature resistant carbon based fiber, polyacrylonitrile scrim, a silica fiber mesh and oxidized polyacrylonitrile fiber.

9. The shipping container as in claim 1 and wherein the exterior container is constructed from a paper material.

10. The shipping container as in claim 1 and wherein the sides and bottom of the metal container are not in contact with the sides and bottom of the exterior container to provide an open space therebetween.

11. The shipping container as in claim 1 and further comprising foot members, the foot members extend from the bottom of the metal container and are in contact with the bottom of the exterior container.

12. The shipping container as in claim 1 and wherein the exterior container is lined with a metal foil material.

13. The shipping container as in claim 1 and wherein the top of the metal container includes a lip member, the lip member contacts the sides of the exterior container.

* * * * *